Nov. 3, 1931.  S. FISCHER  1,829,857
CHAIN CONNECTER
Filed May 21, 1929
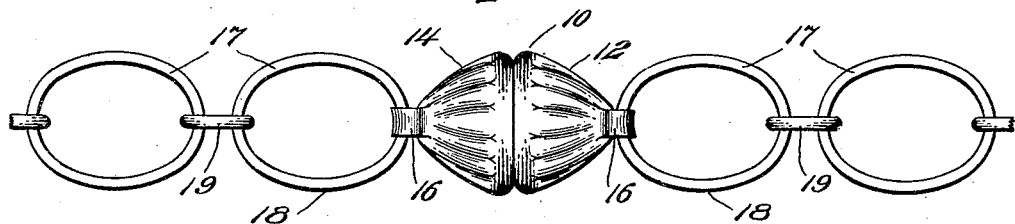
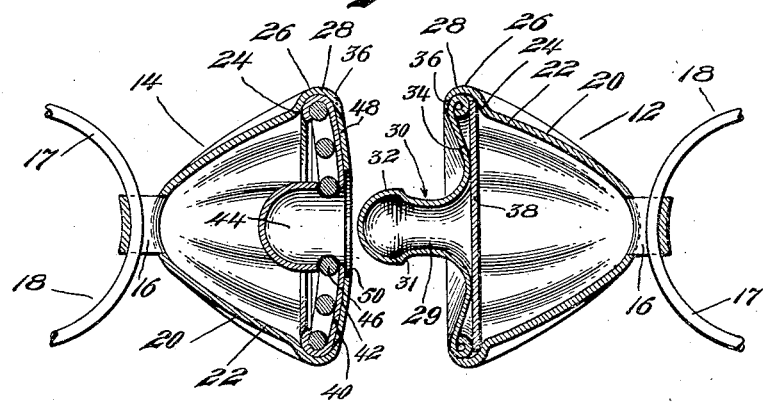
Inventor
Sigmund Fischer
By Thomas A. Jenckes Jr.
Attorney Patented Nov. 3, 1931

1,829,857

UNITED STATES PATENT OFFICE

SIGMUND FISCHER, OF PROVIDENCE, RHODE ISLAND

CHAIN CONNECTER

Application filed May 21, 1929. Serial No. 364,883.

My invention relates to a connecter for releasably attaching together the ends of a chain, a strap or the like.

An object of my invention is to provide a connecter consisting of a pair of cooperating connecter members, each having means such as an eye on the outer end thereof for attachment of a chain end thereto and cooperating male and female separable fastener elements preferably of a type which are relatively swivelable to each other secured within the inner respective ends of said members, whereby the male and female separable fastener elements may have all the pull exerted outwards therefrom so that the elements may tend to always stay in the same relative position and not become tipped as those described in my Patent No. 1,574,692 for chain connecter, issued March 22, 1926 on which this present invention is an improvement.

A further object of my invention resides in the fact that I provide separable fastener elements wherein the male element thereof is resiliently releasable and preferably swivelably retained within the socket of the female element thereof so as to permit the connecter members to swivel relative to each other. This feature is particularly important where a flat chain or strap is employed to permit the connecter elements to swivel relative to each other when connected in any relative position to permit the chain to lie flat.

These and such other objects of my invention as may hereinafter appear will be best understood from a description of the accompanying drawings which illustrate an embodiment thereof.

In the drawings, Fig. 1 is a side elevation of a chain having my improved chain connecter attached thereto.

Fig. 2 is an enlarged sectional view taken through the chain connecter, adjacent links being shown in elevation.

In the drawings, wherein like characters of reference indicate like parts throughout, 10 generally indicates a chain connecter constructed in accordance with the teachings of my invention.

As shown, said connecter comprises a pair of cooperating connecter members 12 and 14 respectively. The member 12 comprises a male connecter member and the member 14 comprises a female connecter member, each of said members 12 and 14 respectively being provided with means at the outer end thereof such as an eye 16 for attaching a strap end 18 thereto. Though said connecter members 12 and 14 may be constructed in any suitable fashion they are provided preferably with the hollow conical body portions 20 each having the eye 16 at the outer end thereof and the inwardly projecting side wall 22 having a shoulder 24 near the inner end 26 thereof and a pliable lip 28 interior of said shoulder. The male member 12 is provided with the male separable fastener element 30 having the stud 29 preferably having an enlarged head 32 and a concave inner face 34 exterior of said stud. Said male separable fastener element 30 is adapted to be secured against the shoulder 24 by means of the overlapped edge 36 of the lip 28 of the side wall of said member. If desired a plate 38 may rest against the shoulder 24 and the outer edge of the face 34 of the male element 30. I also suitably secure a female separable fastener element 40 preferably one having a convex inner face 42 having a suitable socket 44 and a male member gripping spring 46 mounted therein, resting on the shoulder 24 of the female member 14. Said female separable fastener element 40 is preferably secured against the shoulder 24 by the overlapped edge 36 of the lip 28 of the female member 14. If also desired a plate 48 having a socket hole 50 therein may be secured between the overlapped edge 36 and the convex face 42 of the female separable fastener element. I preferably so construct the male stud 29 and the female socket 44 so that the male stud 29 may be detachably connected within the female socket 44 and retained therein by the spring 46 preferably by having the spring 46 rest against the shoulder 31 formed on the stud 29 below the enlarged head 32.

While I have shown the inner faces 34 and 42 of the male and female separable fastener elements as concave and convex respectively to secure a snug fit between said connecter sections, it is obvious that they may be constructed of any desired other shape.

It is obvious that any suitable type of chain, strap or otherwise may be employed and I employ the word "chain" in the claims to broadly include any kind of a connecting strap or elongated element to which the outer ends of my improved chain connecter may be attached. It is also apparent that the male and female separate fastener elements may be suitably secured to said connecter elements 12 and 14 in any suitable fashion. As shown particularly in Figs. 1 and 2, it is obvious that the pull will be exerted directly outwards thus permitting the connecter to always be symmetrical with the chain and not tipped as in the embodiment shown in my prior patent. As stated my invention is particularly adapted for use with flat chain, such as the type shown consisting of the large links 17 and smaller links 19 so arranged that the larger links will lie flat against a surface. It is thus obvious that particularly when a flat chain of the type shown is employed that no matter at what relative position the male stud 29 may be secured within the female socket 44 that said male shank 29 and female socket 44 will swivel relative to each other to permit the chain 18 to lie flat against its respective surface.

It is understood that my invention is not limited to the specific embodiment shown and that various deviations may be made therefrom without departing from the spirit and scope of the appended claims.

What I claim is:

1. A chain connecter comprising a pair of connecter members having hollow body portions each having an eye at the outer end thereof, an inwardly projecting side wall having a shoulder near the inner end thereof and a lip interior of said shoulder, a plate resting on the shoulder of one of said members, a male separable fastener element having a concave inner face and a stud projecting inwards therefrom resting on said plate and secured to said member by the overlapped edge of the lip of the side wall of said member, a female separable fastener element having a convex inner face, a socket and a male member gripping spring mounted therein resting on the shoulder of said other member, a convex plate having a socket hole therein resting on the inner face of said female separable fastener element, said plate and female separable fastener element being secured against said shoulder by the overlapped edge of the lip of the side wall of said member.

2. A chain connecter comprising a pair of connecter members having hollow body portions each having an eye at the outer end thereof, an inwardly projecting side wall having a shoulder near the inner end thereof and a lip interior of said shoulder, a male separable fastener element having a concave face and a stud projecting inwards therefrom overlying the shoulder of one of said members and secured to said member by the overlapped edge of the lip of the side wall of said member, a female separable fastener element having a convex inner face, a socket and a male member gripping spring mounted therein resting on the shoulder of said other member, said female separable fastener element being secured against said shoulder by the overlapped edge of the lip of the side wall of said member.

3. A chain connecter comprising a pair of connecter members having hollow body portions each having an eye at the outer end thereof, an inwardly projecting side wall having a shoulder near the inner end thereof and a lip interior of said shoulder, a plate resting on the shoulder of one of said members, a male separable fastener element having a concave inner face and a stud projecting inwards therefrom resting on said plate and secured to said member by the overlapped edge of the lip of the side wall of said member, a female separable fastener element having a socket and a male member gripping spring mounted therein resting on the shoulder of said other member, a convex plate having a socket hole therein resting on the inner face of said female separable fastener element, said plate and female separable fastener element being secured against said shoulder by the overlapped edge of the lip of the side wall of said member.

4. A chain connecter comprising a pair of connecter members having hollow body portions each having an eye at the outer end thereof, an inwardly projecting side wall having a shoulder near the inner end thereof and a lip interior of said shoulder, a male separable fastener element having an inner face and a stud projecting inwards therefrom, overlying the shoulder of one of said members and secured to said member by the overlapped edge of the lip of the side wall of said member, a female separable fastener element having a socket and a male member gripping spring mounted therein resting on the shoulder of said other member, said female separable fastener element being secured against said shoulder by the overlapped edge of the lip of the side wall of said member.

In testimony whereof I affix my signature.

SIGMUND FISCHER.